(12) United States Patent
Schaye

(10) Patent No.: US 12,447,895 B2
(45) Date of Patent: *Oct. 21, 2025

(54) VISUAL FRONT ALERT SYSTEM

(71) Applicant: Pedestrian Safety Solutions, LLC, New York, NY (US)

(72) Inventor: Paul L. Schaye, Delray Beach, FL (US)

(73) Assignee: Pedestrian Safety Solutions, LLC, New York, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/438,867

(22) Filed: Feb. 12, 2024

(65) Prior Publication Data
US 2024/0416831 A1     Dec. 19, 2024

Related U.S. Application Data

(63) Continuation-in-part of application No. 18/102,832, filed on Jan. 30, 2023, now Pat. No. 12,097,800.
(Continued)

(51) Int. Cl.
*B60Q 1/50*     (2006.01)
*B60Q 1/00*     (2006.01)
(Continued)

(52) U.S. Cl.
CPC ........... *B60Q 1/543* (2022.05); *B60Q 1/0035* (2013.01); *B60Q 1/54* (2013.01); *B60R 16/033* (2013.01);
(Continued)

(58) Field of Classification Search
CPC ........ B60Q 1/543; B60Q 1/0035; B60Q 1/54; B60Q 1/50; B60Q 1/34; B60R 16/033;
(Continued)

(56) References Cited

U.S. PATENT DOCUMENTS

| | | |
|---|---|---|
| 4,488,141 A | 12/1984 | Ohlenforst et al. |
| 5,798,691 A | 8/1998 | Tim Kao |

(Continued)

FOREIGN PATENT DOCUMENTS

| | | |
|---|---|---|
| CN | 216345761 U | 4/2022 |
| CN | 217540612 U | 10/2022 |

(Continued)

OTHER PUBLICATIONS

International Preliminary Report on Patentability for Appln. No. PCT/US2023/061638 mailed May 15, 2025, 9 pages.
(Continued)

*Primary Examiner* — Ryan W Sherwin
(74) *Attorney, Agent, or Firm* — Dinsmore & Shohl LLP

(57) ABSTRACT

A visual front alert system attached to an inside surface of a vehicle windshield for instructing observers as to movement of the vehicle. A strip shaped body includes outer layers of a silicone material which incorporates flex PCB containing a plurality of illuminating elements. A clear adhesive is applied over the front silicone layer for securing the strip display bodies to surface locations of the windshield. An accelerometer is connected to the PCB, with a power supply operating the accelerometer and PCBA. In response to a determined acceleration of the structure, the accelerometer inputs a signal to the PCB, representative of the vehicle movement, with the PCB in turn providing an output signal causing the illuminating elements to generate a visual output corresponding to said input signal. The visual output further includes a first output representative of a steady or accelerating motion of the vehicle and a second output further representative of a decelerating or braking condition of the vehicle.

13 Claims, 10 Drawing Sheets

Related U.S. Application Data

(60) Provisional application No. 63/422,140, filed on Nov. 3, 2022.

(51) Int. Cl.
| | | |
|---|---|---|
| *B60Q 1/54* | (2006.01) | |
| *B60R 16/033* | (2006.01) | |
| *F21S 43/14* | (2018.01) | |
| *F21S 43/15* | (2018.01) | |
| *F21W 103/20* | (2018.01) | |
| *F21W 103/30* | (2018.01) | |

(52) U.S. Cl.
CPC .............. *F21S 43/14* (2018.01); *F21S 43/15* (2018.01); *F21W 2103/20* (2018.01); *F21W 2103/30* (2018.01)

(58) Field of Classification Search
CPC .......... F21S 43/14; F21S 43/15; F21S 43/195; F21W 2103/20; F21W 2103/30
See application file for complete search history.

(56) References Cited

U.S. PATENT DOCUMENTS

| | | | |
|---|---|---|---|
| 7,095,318 B1 * | 8/2006 | Bekhor | B60Q 1/503 |
| | | | 340/464 |
| 7,397,355 B2 | 7/2008 | Tracy | |
| 9,393,902 B2 * | 7/2016 | Le Sage | H05K 1/189 |
| 9,630,551 B2 | 4/2017 | Verrat-Debailleul et al. | |
| 10,272,829 B2 | 4/2019 | Blevins | |
| 10,358,087 B2 | 7/2019 | Kurihara | |
| 10,446,068 B2 | 10/2019 | Butler | |
| 10,688,757 B2 | 6/2020 | Laluet et al. | |
| 10,773,496 B2 | 9/2020 | Aoki et al. | |
| 10,829,038 B1 | 11/2020 | Lara Contreras et al. | |
| 10,981,496 B2 | 4/2021 | Schaye | |
| 11,325,530 B2 | 5/2022 | Yi | |
| 2002/0036908 A1 * | 3/2002 | Pederson | B60Q 1/2611 |
| | | | 362/545 |
| 2002/0130773 A1 | 9/2002 | Santa Cruz et al. | |
| 2004/0057241 A1 * | 3/2004 | Lin | F21S 4/20 |
| | | | 340/468 |
| 2005/0024197 A1 * | 2/2005 | Cheng | B60Q 1/2665 |
| | | | 340/475 |
| 2005/0110629 A1 * | 5/2005 | Williams | B60Q 1/50 |
| | | | 340/463 |
| 2006/0125615 A1 | 6/2006 | Song | |
| 2006/0125616 A1 | 6/2006 | Song | |
| 2006/0250229 A1 | 11/2006 | Cheng et al. | |
| 2007/0139927 A1 | 6/2007 | Delasko | |
| 2010/0177524 A1 * | 7/2010 | Svelander | F21S 41/30 |
| | | | 362/504 |
| 2013/0249394 A1 * | 9/2013 | Fay | F21S 41/153 |
| | | | 315/297 |
| 2014/0035740 A1 | 2/2014 | Lettsrom et al. | |
| 2015/0062935 A1 | 3/2015 | Braunberger | |
| 2015/0282346 A1 | 10/2015 | Ganim et al. | |
| 2015/0375673 A1 * | 12/2015 | Testai | B60Q 1/268 |
| | | | 362/545 |
| 2016/0193961 A1 * | 7/2016 | Fischer | G08G 1/166 |
| | | | 340/436 |
| 2016/0297377 A1 * | 10/2016 | Salomonsson | G03B 11/00 |
| 2018/0079353 A1 | 3/2018 | Litke et al. | |
| 2018/0202622 A1 * | 7/2018 | Arce | F21S 43/14 |
| 2018/0238513 A1 * | 8/2018 | Measel | B32B 17/10761 |
| 2019/0001888 A1 | 1/2019 | Labrot et al. | |
| 2019/0111833 A1 * | 4/2019 | Nielsen | B60Q 1/2665 |
| 2019/0272779 A1 * | 9/2019 | Gamble | B60Q 1/2626 |
| 2019/0277471 A1 * | 9/2019 | Christian | B60Q 1/34 |
| 2020/0282895 A1 | 9/2020 | Yi | |
| 2020/0353862 A1 * | 11/2020 | Schaye | B60Q 1/2665 |
| 2020/0370727 A1 * | 11/2020 | Berard | B32B 17/10788 |
| 2020/0398740 A1 * | 12/2020 | Yi | B60Q 1/2665 |
| 2021/0380034 A1 * | 12/2021 | Kleo | F21S 43/14 |
| 2022/0026039 A1 * | 1/2022 | Jennings | F21S 43/14 |
| 2022/0250448 A1 * | 8/2022 | Mannheim Astete | B60J 3/04 |
| 2025/0010789 A1 * | 1/2025 | Schaye | B60Q 1/543 |

FOREIGN PATENT DOCUMENTS

| | | |
|---|---|---|
| EP | 0046717 B1 | 10/1985 |
| FR | 2877894 A1 | 10/2011 |
| KR | 101078142 B1 | 10/2011 |
| NL | 1029717 C1 | 2/2007 |

OTHER PUBLICATIONS

International Search Report and Written Opinion for Appln. No. PCT/US2023/061638 mailed Mar. 25, 2025, 43 pages.

* cited by examiner

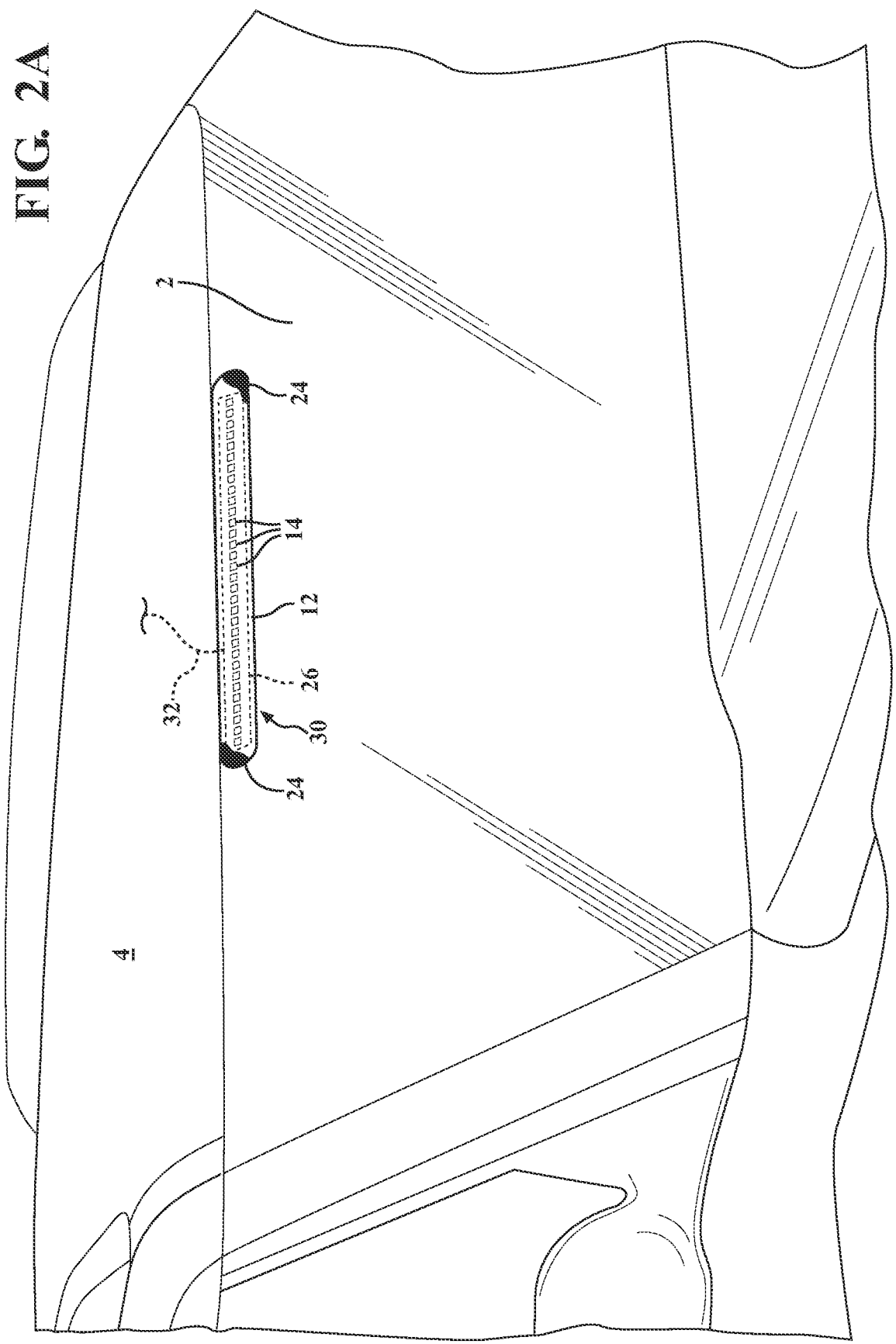

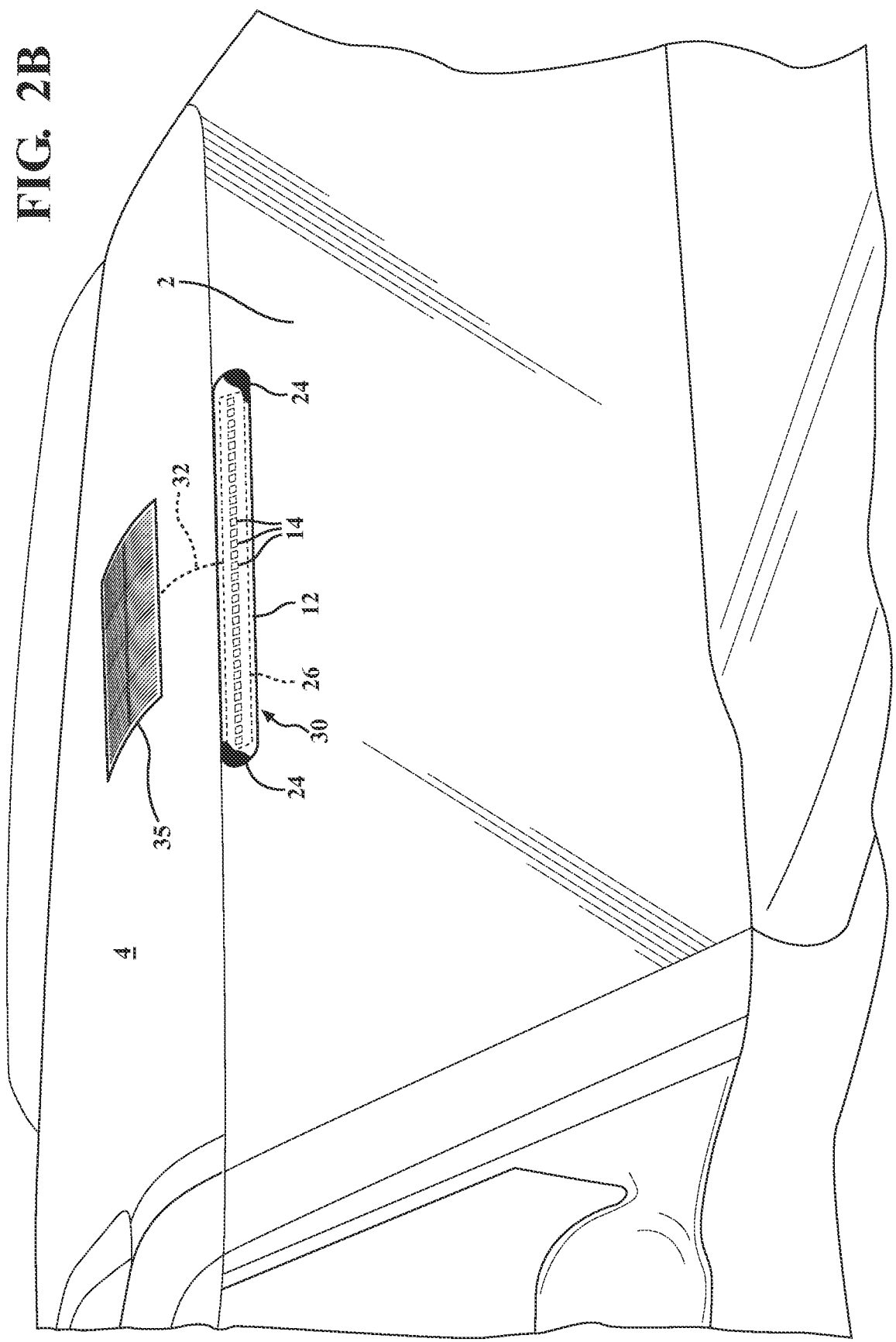

VISUAL FRONT ALERT SYSTEM

CROSS REFERENCE TO RELATED APPLICATIONS

The present application is a continuation in part of and claims the priority of U.S. Ser. No. 18/102,832, filed Jan. 30, 2023. The '832 application claims priority of U.S. Ser. No. 63/422,140 filed Nov. 3, 2022.

FIELD OF THE INVENTION

The present invention relates generally to a visual front alert system (VFAS). More specifically, the present invention teaches a visual front alert system such as integrated into a thin strip shaped display attachable to a vehicle windshield. The strip display attaches to an inside surface of the windshield and incorporates outer silicone layers which encapsulate a flex PCB containing SPI LED drivers. A separate control box is provided, such as integrated into a vehicle headliner, and which communicates with the PCB. A clear adhesive cover is further provided which covers a forward of the silicone layers, with such as an outer perimeter binding of the clear adhesive cover adhering the VFAS assembly to the inside of the front windshield.

BACKGROUND OF THE INVENTION

The prior art is documented with examples of visual alert systems, such as which can be mounted to a vehicle for notifying pedestrians and other drivers as to whether a subject vehicle is braking/decelerating.

A first example is set forth in U.S. Pat. No. 10,981,496 to Schaye, and which teaches a visual deceleration apparatus for indicating vehicle deceleration. A housing is visible from a front of the vehicle and which incorporates a printed circuit board, an electrical connection and an accelerometer for signaling a plurality of LEDs to instruct the braking condition of the vehicle. An associated method is disclosed for creating a lighting pattern on a light strip associated with the LEDs for instructing vehicle deceleration/braking.

U.S. Pat. No. 11,524,628, to Takori et al., teaches a notification device in a vehicle which enables a person outside the vehicle to be notified of a predetermined operating state of the vehicle by its light emission. A plurality of spot-shaped light sources are arranged at intervals to follow an upper edge of a windshield, a reflecting part reflecting light from the light sources to a front. An outer lens transmits therethrough the light heading toward the front from the reflecting part. The outer lens has on at least one of front and rear faces thereof a fine concave-convex face diffusing the light transmitted through the outer lens.

Other known assemblies include each of the accessory brake light system of Tim Kao (U.S. Pat. No. 5,798,691, the vehicle accelerator and brake indicators of Song (US 2006/0125615), the advance warning system of Cheng (US 2006/0250229) and the vehicle acceleration/deceleration warning light of Tracy (U.S. Pat. No. 7,397,355). In each instance, a lighting assembly is incorporated into a housing of some type which is mounted at a given location of a vehicle.

SUMMARY OF THE INVENTION

The present invention discloses a visual front alert system (VFAS) for instructing pedestrians or other drivers (collectively observers) as to the movement of a subject vehicle. Specifically, the alert system provides a variety of illuminating options for indicating to observer(s) located forward of the subject vehicle as to whether the vehicle is maintaining a given speed, is accelerating or is decelerating, such as which is further indicative of a braking condition.

The alert system is provided as a thin strip shaped body, which can include but is not limited to a plasticized material having any degree of flexibility. The body incorporates a plurality of illuminating elements on a forward facing surface, such as LED elements, and which include wiring connections extending to a PC board assembly (also PCBA) with built in accelerometer or other vehicle motion control input (conventionally referenced as the vehicle ECM or engine control module) for illuminating the LED's based on the vehicle movement.

As will be further described, alternate variants include accessing the existing vehicle motion control circuitry, which can operation in combination with or substitute for the accelerometer for directly communicating with the vehicle processor or PCBA. This includes the PCBA instructing a first visual output by the LED's representative of a first steady or accelerating movement condition, with a second instructed visual output further representative of a decelerating or braking condition of the subject vehicle (the invention also contemplates the second visual output or a further output being representative of an accelerating condition).

In order to prevent distraction to the subject vehicle driver, the forward facing surface of the strip shaped body includes a darkened (typically black) surface coating upon which are arranged the LEDs. In this fashion, glare resulting from the visual output of the LEDs is largely shielded from the driver.

In a first application, the strip shaped body is attached to either of interior or exterior surfaces of the windshield, such as mechanically or adhesively. In a preferred application, the adhesive strip is secured to the interior surface of the windshield and communicated, via the connecting strips, to the PCBA and associated accelerometer or other native motion control circuitry of the vehicle.

In a further application, the strip shaped body is bonded between interior layers of the vehicle windshield, such as via a suitable lamination process. In this variant, a separate module containing the PCBA can be secured, such as adhesively, to such as an interior surface of the windshield and which provides wireless instructed illumination and power of the in-laminated LED strips wirelessly through the glass windshield. Without limitation, the adhesively secured patch can include a substantially thin and transparent construction and can integrate any necessary generating coils and/or circuitry required for issuing targeted communications to the strip or strips laminated within the windshield. To this end, the adhesively applied windshield patch can be powered by a single line extending from the vehicle, with the LED in-windshield laminated strips further incorporating any necessary circuitry for interpreting the wireless signals and providing the instructed targeted illumination according to any of intensity, pattern or color. Other powering options can include the provision of a solar powered strip or sheet attached or integrated into the vehicle roof and connected to the strip display.

An electrical power supply is provided to the strip shaped body and, in a first application, includes additional connections extending between the PCBA and a battery of the vehicle. In a further application, a portable battery can be substituted for a dedicated hookup connection for powering the PCBA, accelerometer and LEDs. Other variants include first and second strip displays arrayed at upper windshield edge locations associated with each of driver (right) and passenger (left) sides of the vehicle, with the right/left strip displays providing additional functionality to operate as a turn signal in addition to providing visual identification of the travel condition of the vehicle.

In a further variant, a thin strip shaped display is attachable to a vehicle windshield. The strip display attaches to an inside surface of the windshield and incorporates outer silicone layers (including a black rear silicone layer and a front clear silicone layer), which encapsulate therebetween a flex PCB containing SPI LED drivers. A separate control box is provided, such as integrated into a vehicle headliner, and which communicates with the PCB. A clear adhesive cover is further provided which covers a forward of the silicone layers in order to adhere the VFAS assembly to the inside of the front windshield.

BRIEF DESCRIPTION OF THE DRAWINGS

Reference will now be made to the attached drawings, when read in combination with the following detailed description, wherein like reference numerals refer to like parts throughout the several views, and in which:

FIG. 2A is a similar illustration to FIG. 2 and depicting a further variant having a separate module containing the PCBA which can be secured, such as adhesively, to an interior surface of the windshield behind the in-laminated strip display body and which provides instructed illumination of the LEDs wirelessly from the patch through the glass windshield;

FIG. 2B presents a similar illustration to FIG. 2A and depicts a further variant in which a solar sheet is integrated into the vehicle roof and communicated to the strip shaped body;

DETAILED DESCRIPTION OF THE PREFERRED EMBODIMENTS

Figure 1:
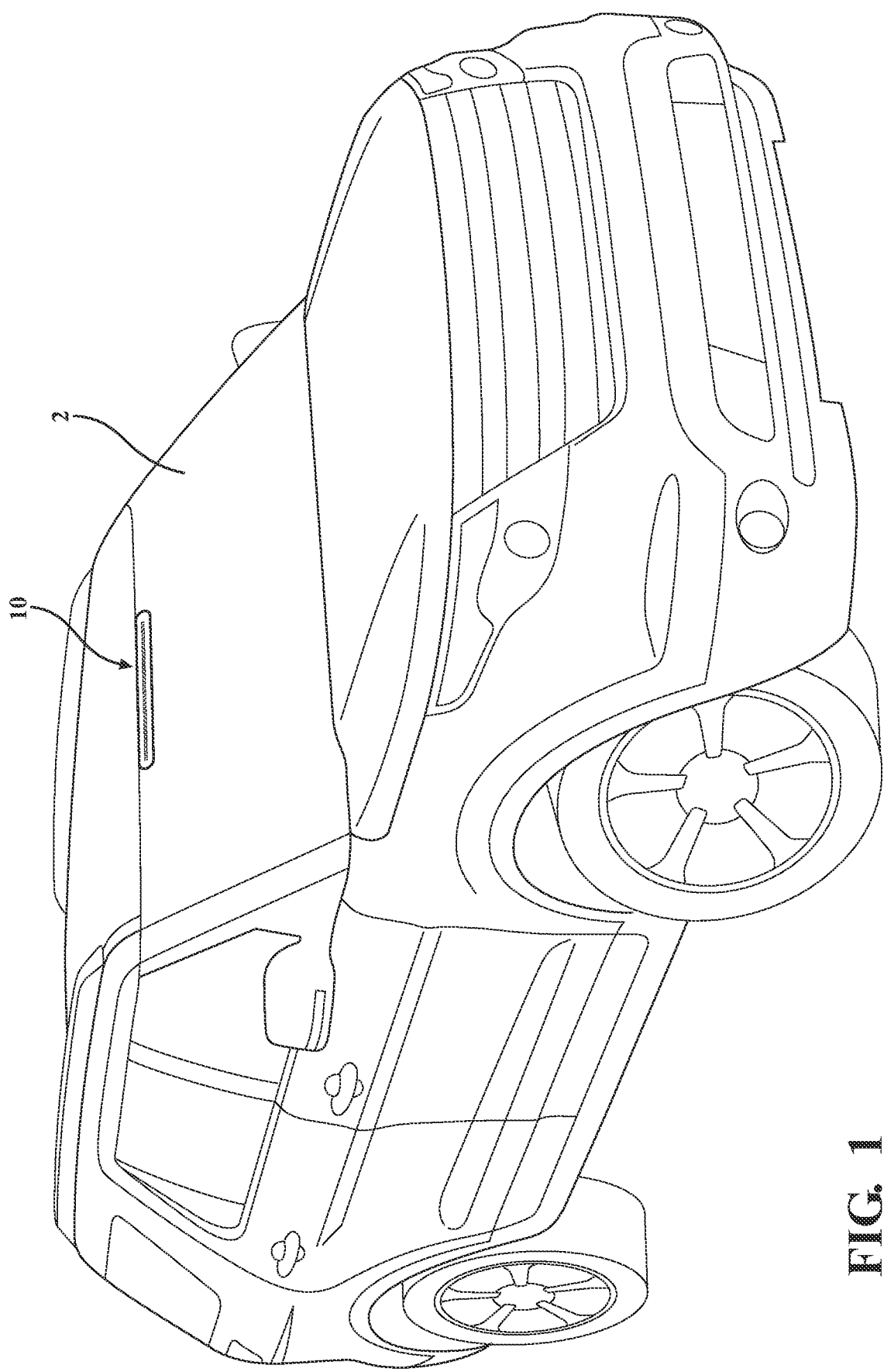
FIG. 1 is an environmental view of the vehicle alert system according to the present invention secured to a vehicle windshield.

With reference to the attached illustrations, and initially FIG. 1, the present invention discloses a visual front alert system (generally at 10) for instructing pedestrians or other drivers (collectively observers) as to the movement of a subject vehicle. Specifically, and as will be further described, the alert system can be either attached or incorporated by lamination between interior layers of a vehicle windshield 2, such as in order to indicate to the observer(s) located forward of the subject vehicle as to whether the vehicle is maintaining a given speed or is either accelerating or decelerating, this further indicative of any non-constant travel condition of the vehicle, with the lattermost being indicative of a braking condition.

Figure 2:
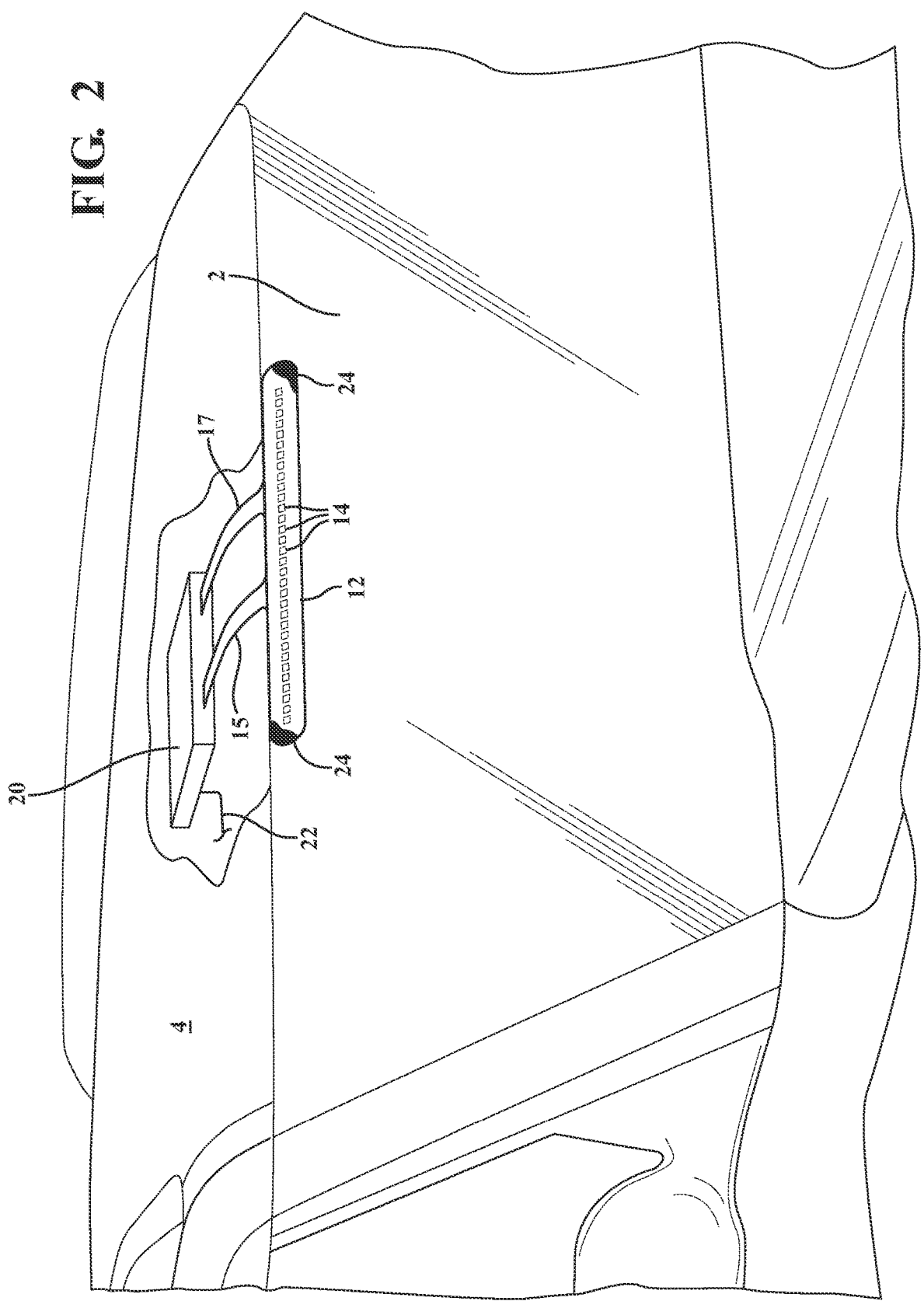
FIG. 2 is an enlarged and partially cutaway view of the vehicle alert system of FIG. 1 and depicting the strip display connecting portions extending to the housing mounted within the vehicle headliner and including each of the PCBA board and accelerometer.
Figure 4:
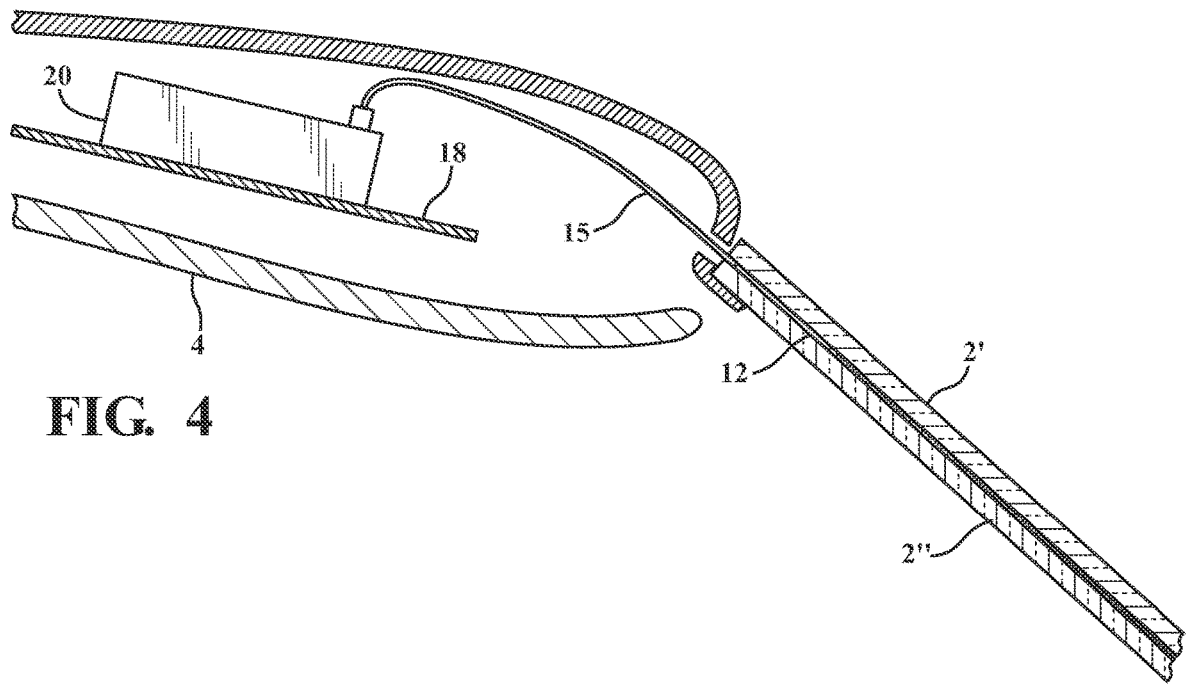
FIG. 4 is a side cutaway view of the environmental arrangement generally shown in FIG. 2 and depicting a variant of the present invention in which the strip shaped body is bonded or laminated between layers of the windshield.
Figure 5:
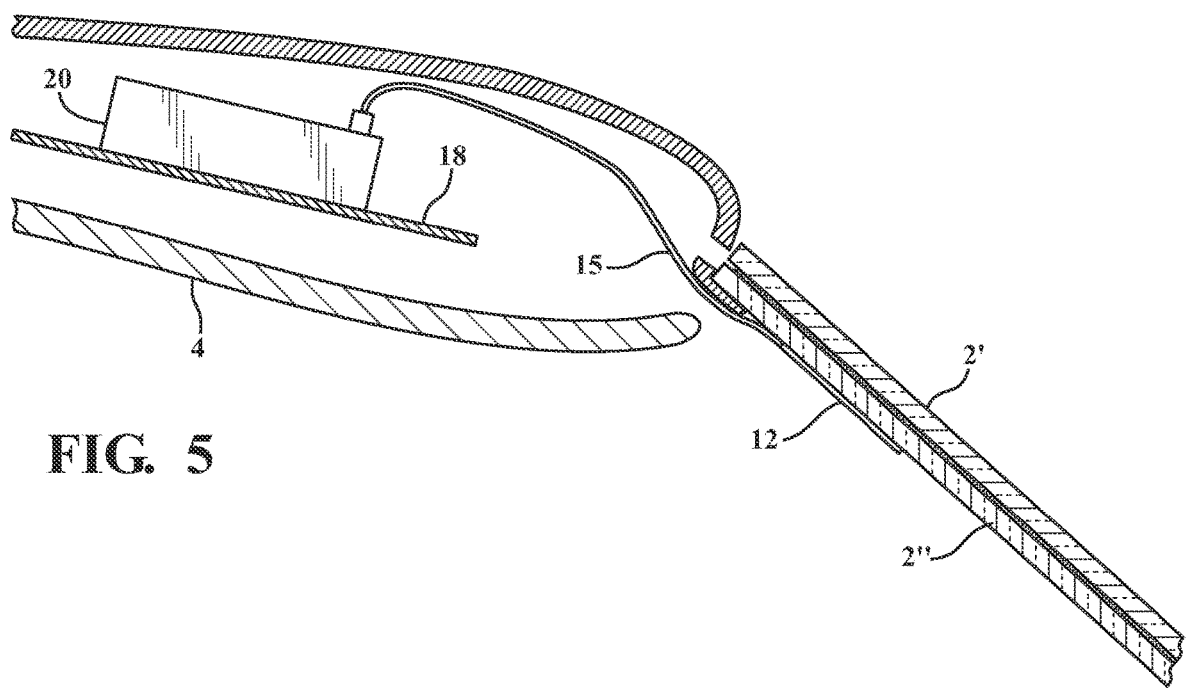
FIG. 5 is a further side cutaway similar to FIG. 4 and depicting a second variant in which the strip shaped body is secured to an inside surface of the windshield.

With further reference to FIG. 2, the alert system includes a main strip display body 12, such as without limitation be constructed of a plasticized material, which can be flexible or rigid to varying degrees. The body 12 incorporates a plurality of illuminating elements 14 arranged on a forward facing surface. The illuminating elements can, without limitation, include any suitable options such as light-emitting diode or LED elements (the term LED or illuminating element being interchangeably referenced at 14), with wiring connections (see harness at 16 in FIG. 3) depicted in the illustrated embodiment extending in series or parallel to any type of vehicle processor component not limited to a PC board assembly (also termed as a PCBA 18 as shown in FIGS. 4-5).

As is further known, the LED's 14 are a subset of electroluminescent lamps, which are generally defined as devices which convert electrical energy into light or luminescence, with the term luminescence generally associated with solids that generate light. In the case of electroluminescence, an electric field (voltage) applied to a thin phosphor layer produces light. Without limitation, the LEDs can be substituted with any other suitable illuminating elements within the scope of the present invention.

Figure 3:
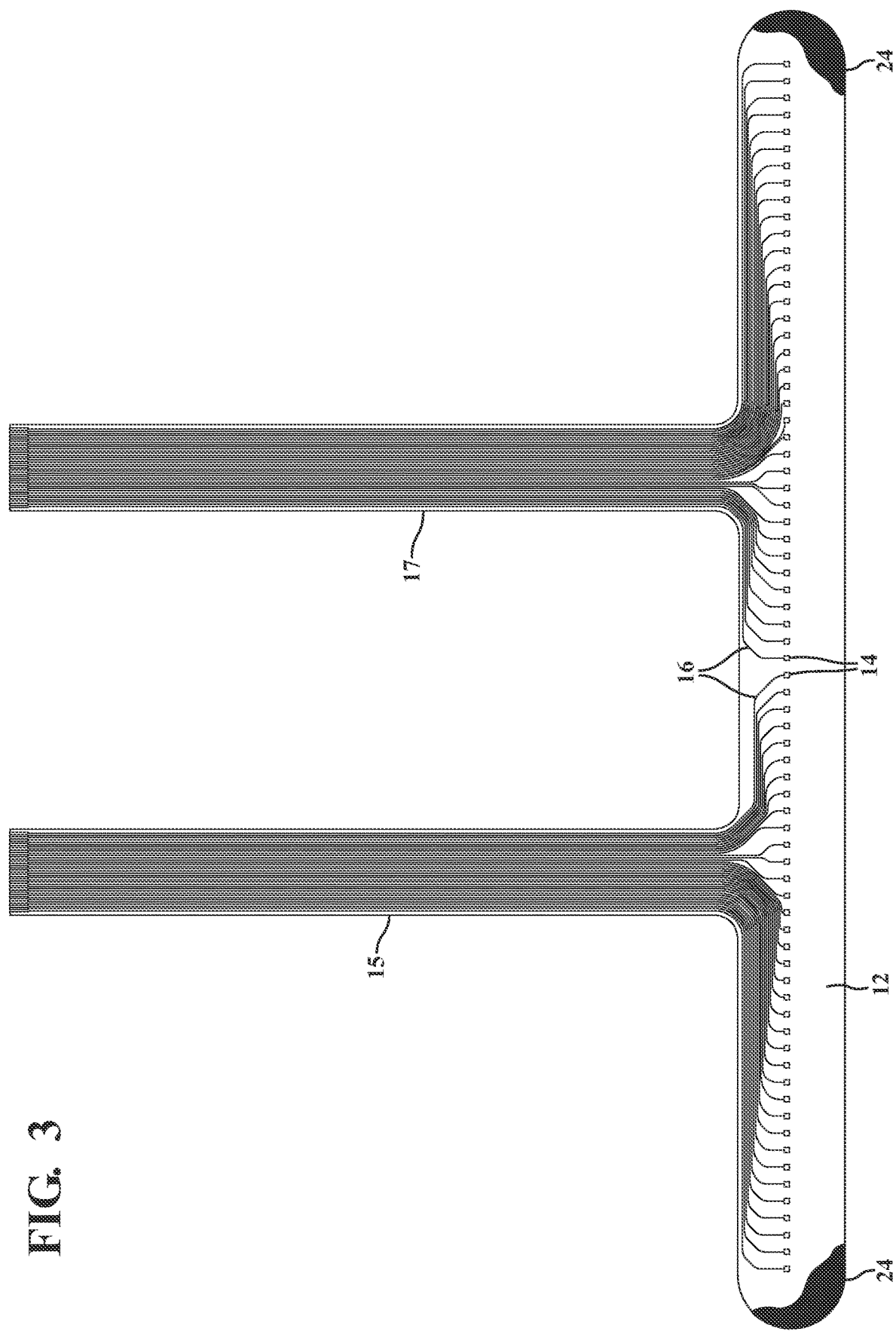
FIG. 3 is a planar cutaway view of the strip shaped body and depicting the wiring connections extending to the forward located LEDs.

As further shown in FIGS. 2-3, a pair of connecting strips 15 and 17 are shown extending from intermediate locations of the main strip shaped body 12 to a collective housing combining the PCBA 18 and an accelerometer component 20, which can also be incorporated directly into the PCBA 18. As best shown in the planar cutaway view of FIG. 3, the wiring connections 16 are split into subset pluralities extending through each of the connecting strips 15/17.

It is understood that additional embodiments can be substituted for that shown and contemplate any of the use of a single connecting strip, other multiple connecting strips or of substituting the wiring connections 16 and associated connecting strips 15/17 entirely in favor of any wireless connection not limited to Bluetooth®, NFC (near field communication) or other short range wireless connectivity technology configured between the PCBA 18 and accelerometer 20 to the individual LEDs 14.

In this fashion, the PCBA 18 instructs the visual output (illumination) of some or all of the LEDs 14 based on the vehicle movement sensed by the accelerometer 20. Without limitation, the PCBA 18 is mounted to a vehicle location, depicted in FIG. 2 as being located at an interior headliner location 4 associated with a roof of the vehicle proximate the strip display 12 which extends along an uppermost edge of the windshield, it being understood that the strip display can be positioned at any location of the windshield which is visible to the forward located observer.

An electrical power supply (such as originating from a vehicle battery and represented by input line 22 in FIG. 2) is provided to the PCBA 18 and accelerometer 20. In a further application, a portable battery supply (not shown) is provided for powering the PCBA, accelerometer and LEDs, and which can be integrated into a compartment (not shown) associated with the vehicle headliner 4.

As is further known, the accelerometer 20 is a device that measures the vibration, or acceleration of motion of a structure. The force caused by vibration or a change in motion (acceleration) causes the mass to "squeeze" the piezoelectric material, which produces an electrical charge that is proportional to the force exerted upon it. Since the charge is proportional to the force, and the mass is a constant, then the charge is also proportional to the acceleration.

In this manner, an accelerometer 20 works using an electromechanical sensor to measure dynamic acceleration, defined as non-uniform acceleration forces when compared to its previous state. The theory behind accelerometers is that they can detect acceleration and convert it into measurable quantities like electrical signals.

The present invention also contemplates pairing or substituting the accelerometer 20 with any native vehicle motion detection capabilities, such as relating to the vehicle's motion control circuitry which is integrated into its network (such as also associated with the vehicle engine control module or ECM component).

In operation, the PCBA 18 instructs a first visual output by the illuminating elements 16 representative of a first steady or accelerating movement condition (this generally representing to the forward located observer that the vehicle is traveling a steady motion), with a second (or third) instructed visual output further representative of either an accelerating or decelerating/braking condition of the subject vehicle.

The visual outputs envisioned by the present invention can include a number of different representations presented by the LEDs 14 or other suitable electroluminescent elements, a first of which can also include providing the first output in a first color (such as including but not limited to white), with the second output provided in a second color (such as further including but not limited to yellow or amber). It is further envisioned and understood that the first and second visual representations can be provided according to any of varying illumination intensities, flashing patterns, or the like, such further utilizing any of multiple different colors or a single color.

In order to prevent distraction to the subject vehicle driver, the forward facing surface of the strip shaped body 12 includes a darkened (typically black) surface coating, which is partially depicted at 24 in FIGS. 2-3 for clarify of presentation and so as not to obscure the arrangement of the illuminating elements or LEDs 14. The darkened coating surrounding the illuminating elements is understood to shield the driver and front seat passenger from glare resulting from the visual outputs of the LEDs 14 of the windshield supported strip display 12 which may bleed through the rear of the strip display.

Referencing FIG. 4, presented is a side cutaway view of the environmental arrangement generally shown in FIG. 2 and depicting a first variant of the present invention in which the strip shaped body 12 is bonded or laminated between layers 2' and 2" of the windshield, and such as which can be accomplished according to a variety of processes or techniques.

FIG. 5 is a further side cutaway similar to FIG. 4 and depicts a second variant in which the strip shaped body 12 is secured to an inside surface of the windshield (this represented by inner windshield layer 2"). Without limitation, any adhesive or other chemical or mechanical fastening means can be provided for securing the strip display body to either of the interior or exterior surfaces of the windshield 2.

Referring now to FIG. 2A, a further related application to the in-glass laminated strip variant referenced in FIG. 4 is shown and in which the strip shaped body 12 is bonded between the interior layers (see previously at 2' and 2" in FIG. 4) of the vehicle windshield, such as again via a suitable lamination process. In this variant, a separate module 26 containing a redesigned and simplified version of the PCBA (at 28) can be secured, such as adhesively, to an interior surface of the windshield 2 behind the in glass laminated strip display body and which provides instructed illumination of the in-laminated LED strip or strips 12 wirelessly (further represented at 30) through the glass windshield 2.

Wireless charging operates under the principle of a series of magnetic coils incorporated into the patch 26 generating an oscillating magnetic field, corresponding to a desired frequency of power which is communicated through the inner most glass layer to one or more receiver antennas incorporated into the inner laminated strip display body in order to selectively instruct illumination of the incorporated LED elements in any manner as previously described.

Without limitation, the adhesively secured patch 26 can include a substantially thin and transparent construction and which can integrate any necessary circuitry (such as at minimum including the desired coils) required for issuing targeted communications wirelessly to the strip 12 or strips (see further FIGS. 6-7) laminated within the windshield. To this end, the adhesively applied windshield patch 26 can be powered by a single line 32 extending from the vehicle, with the LED in windshield laminated strips further incorporating any necessary circuitry required for interpreting the wireless signals (such including a wireless receiver component) and providing the instructed targeted illumination according to any of intensity, pattern or color.

Referring to FIG. 2B, other powering options can include the provision of a solar powered strip or sheet, see at 35, which can be attached or integrated into the vehicle roof 4 and connected to the strip display 12, such as via the line 32. Without limitation, the solar sheet 35 can be utilized with any version of the strip display, including both laminated and interiorly/exteriorly attached versions. It is also envisioned that the solar sheet 35 can also be supplemented by any of the traditional vehicle power source and/or any portable power supply as previously described.

A further alternate design considerations of the glass windshield can, without limitation, include the incorporation of fiber optic glass strands (not shown) into the windshield construction at the time in which the LED strips are laminated between the glass layers 2'/2". By this construction, the patch 26 of FIG. 2A can be at any location in communication with the fiber optic glass strand(s), the latter being substantially invisible from the interior of the vehicle while providing targeted communication of the adhesive attached patch circuitry to the LED strips. It is also envisioned that an arrangement of glass fiber strands integrated into the windshield can further be designed with surface input connections in the windshield and in order to communicate with any of interiorly/exteriorly attached versions of the strip shaped bodies as described herein.

Figure 6:
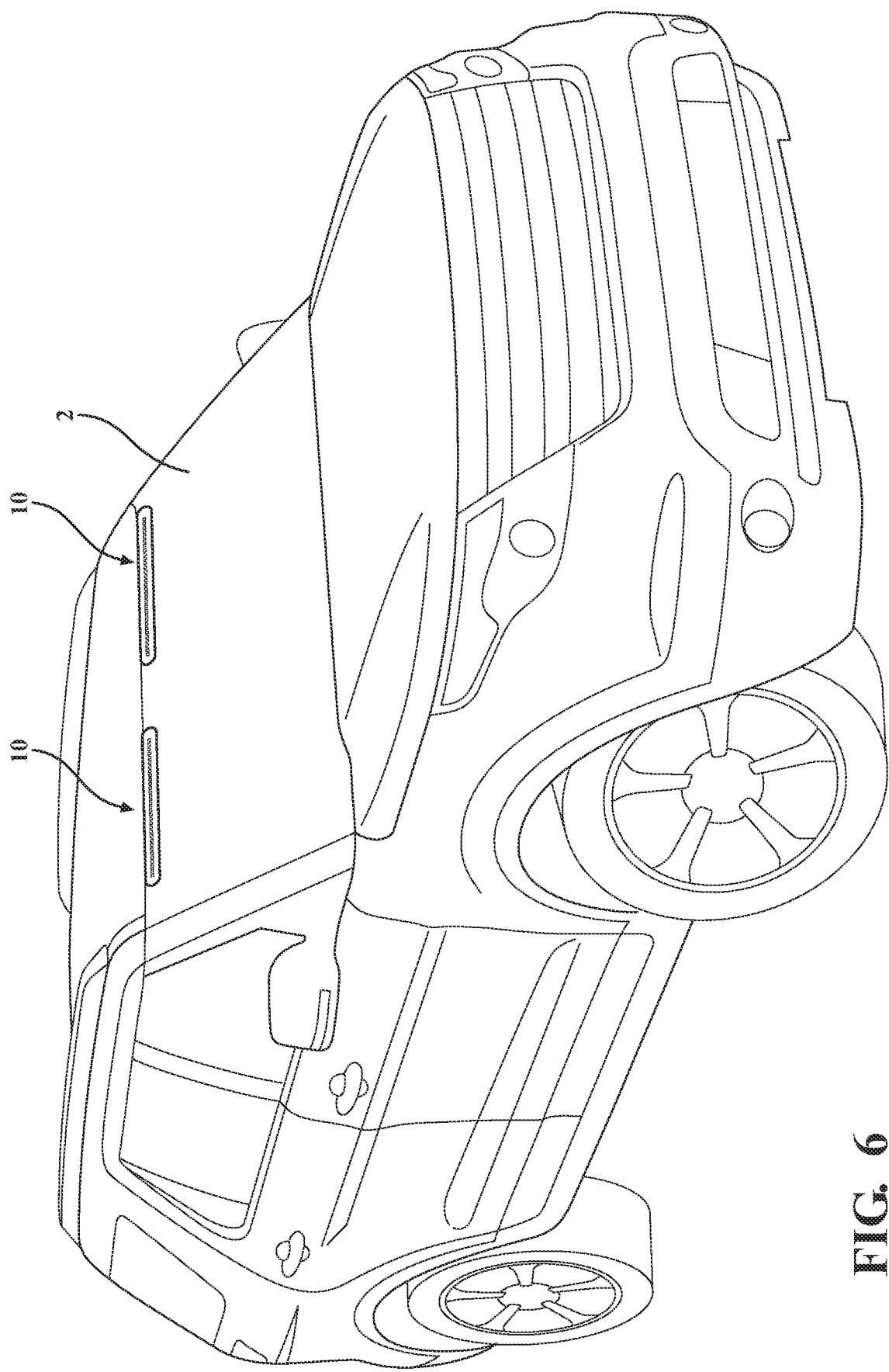
FIG. 6 is an illustration similar to FIG. 1 and depicting an environmental view of the vehicle alert system according to a further embodiment the present invention secured to a vehicle windshield and depicting first and second strip displays arrayed at upper windshield edge locations associated with each of driver and passenger sides of the vehicle.
Figure 7:
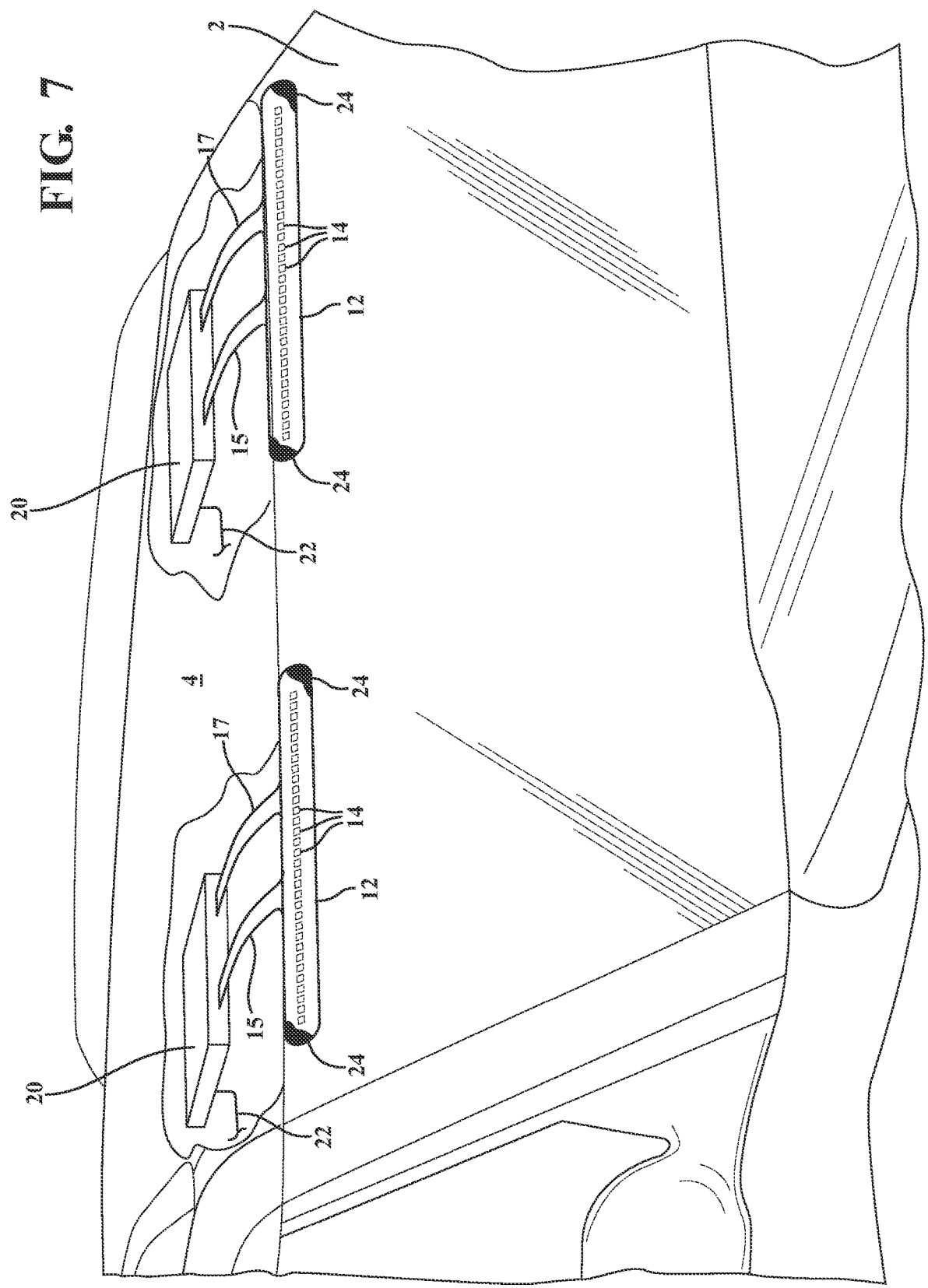
FIG. 7 is an illustration similar to that shown in FIG. 2 of the vehicle alert system of FIG. 6 and depicting the driver and passenger side located strip displays.

Proceeding now to FIG. 6, an illustration similar to FIG. 1 depicts an environmental view of the vehicle alert system according to a further embodiment the present invention secured to a vehicle windshield 2 and showing first and second strip displays 10 arrayed at upper windshield edge locations associated with each of driver and passenger sides of the vehicle windshield. FIG. 7 further provides an illustration similar to that shown in FIG. 2 of the vehicle alert system of FIG. 6 and depicting the driver and passenger side located strip displays in a similar fashion, and which can be connected to a power source located within the vehicle headliner.

Additional to providing all of the illumination features of the single LED strip 12 variant shown in FIGS. 1-5, it is understood that the pair of the driver (right side when viewed from a forward observer) and passenger (left side) strips can also provide turn signal functionality and to this end can be tied into the vehicle ECM or other native control circuitry in parallel to the conventional vehicle turn signal lamps. It is also understood that, with reference to any of the embodiments being described herein, that LED strip displays can be arrayed at any windshield location not limited to the upper edge thereof.

Figure 8:
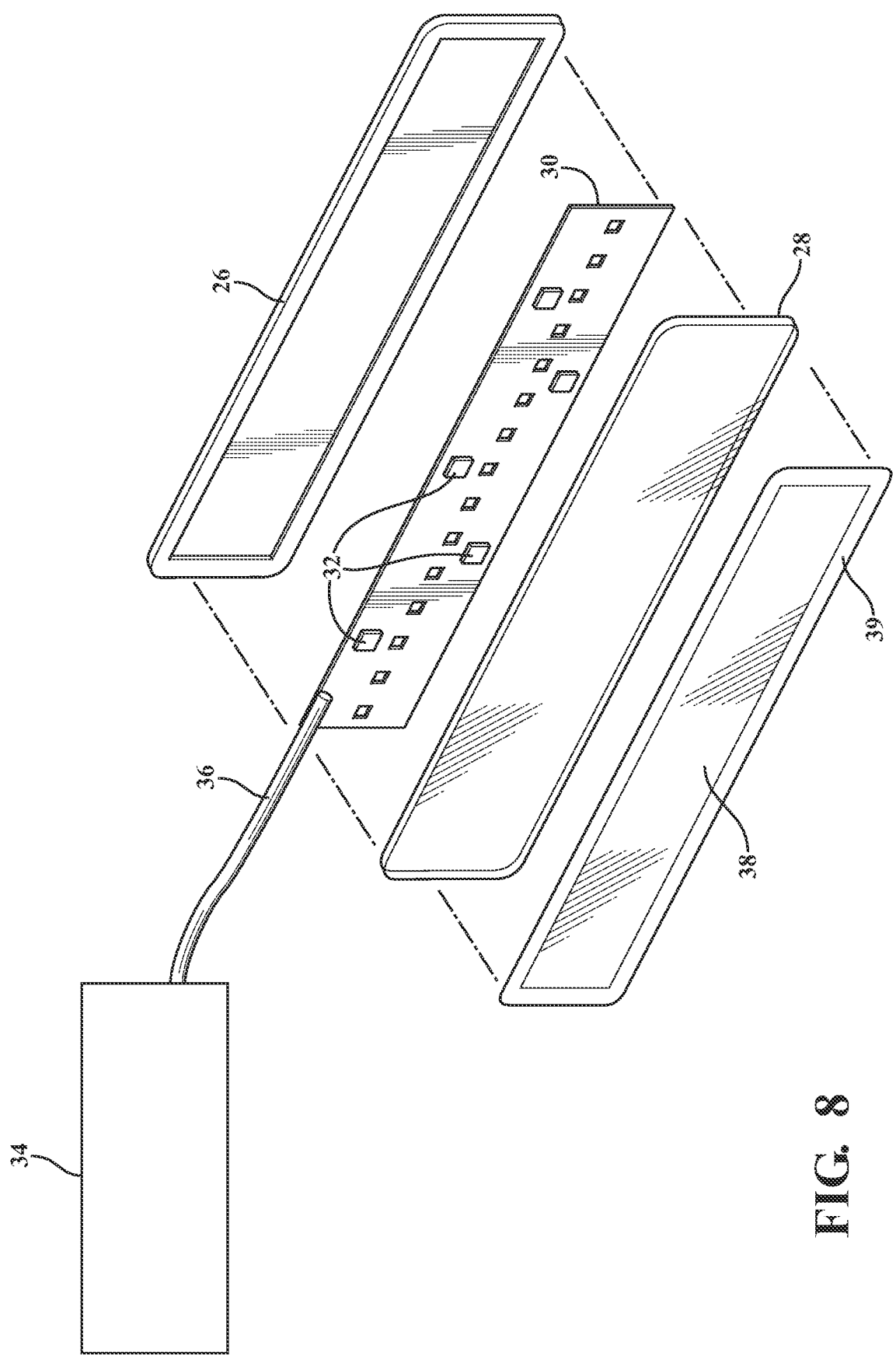
FIG. 8 is an exploded illustration of a vehicle alert system according to a further preferred embodiment and including outer sealing silicone layers in combination with an encapsulated flex PCB with SPI LED drivers.
Figure 9:
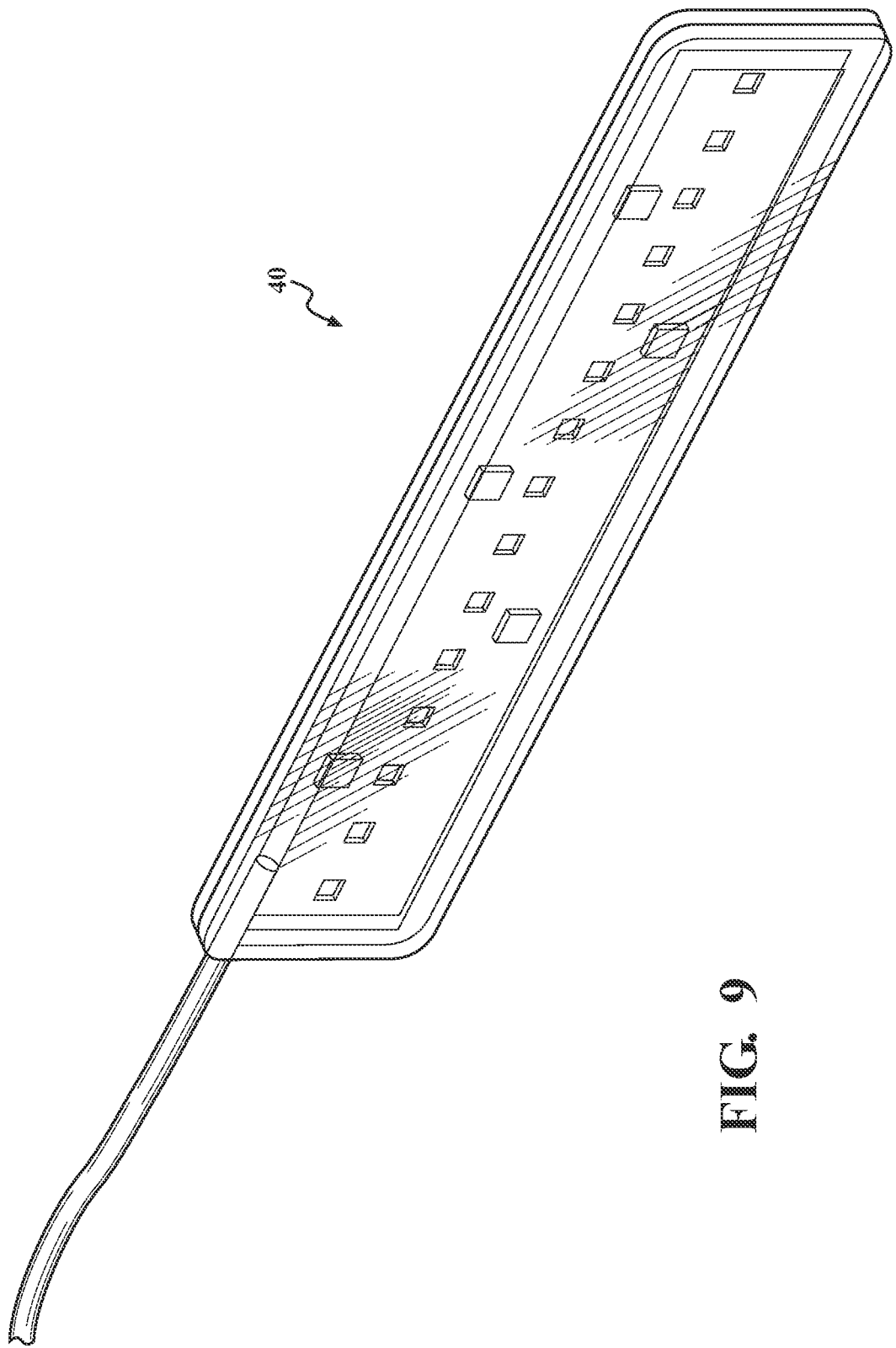
FIG. 9 is an assembled view of the over molded vehicle front alert system of FIG. 8, such as which can be adhered to an inside surface of the front windshield.

Referencing now FIGS. 8-9, respective exploded and assembled views are shown of a thin strip shaped display attachable to the vehicle windshield 2. Similar to the version of FIG. 5, and referencing initially FIG. 8, the strip display is provided as a strip shaped body (this can include any two dimensional shape typically provided as an elongated rectangular or modified rectangular profile) which attaches to an inside surface of the windshield 2. The strip display body incorporates a pair of outer silicone layers, including an elongated rear black (or otherwise darkened) silicone strip 26 and a similarly shaped front clear or transparent silicone strip 28. The rear black silicone layer 26 is intended to absorb backlighting distraction to the driver or front seat passenger, with the clear front strip 28 providing transparency for the illumination of the LED's through the front windshield.

The outer layers 26/28 can be joined together (such as including without limitation the use of any of mechanical/chemical adhesives, sonic welding techniques or heat to bond or join together the edges of the outer silicone layers) to encapsulate therebetween a flexible printed circuit board (PCB) 30 containing SPI (Serial Peripheral Interface) LED drivers 32. As is known, a Serial Peripheral Interface (SPI) is an interface bus commonly used to send data between microcontrollers and small peripherals such as LED's.

A separate control box 34 is provided, this again including the motion control circuitry which is integrated into a vehicle headliner as previously shown at 20, and which communicates with the PCB 30. This can again include a conductor wire 36 (this including such as a four wire conductor arrangement) extending from the control box 34 to the PCB 30, and in addition to other wireless options including any type of Bluetooth or near field communication scheme. As previously stated, power for the VFAS assembly for operating the LED's can be provided through the conductor wire 36 or, alternatively, any of solar or portable battery power can be provided.

A clear adhesive affixing cover 38 is further provided which binds to the front of the clear silicone 28 layer in order to adhere the VFAS assembly to the inside of the front windshield 2. This can also include the clear adhesive cover 38 having an outer affixing perimeter rim or binding 39 (this can include without limitation a raised outer edge which establishes a secure affixation to the inside of the windshield). As finally depicted in FIG. 9, the completed assembly, generally at 40, is shown and which can be secured to the inner windshield surface via the clear adhesive cover 38.

Consistent with the previously described embodiments, the PCB operated LED's (also illuminating elements) can include any lighting scheme or pattern, which can include the use of first and second colors (such as white and yellow) which represent either of constant travel or deceleration of the vehicle, further indicative of a braking condition.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly.

Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A visual front alert system located at a vehicle windshield for instructing observers as to movement of the vehicle, said system comprising:
   a flattened strip shaped body including a front transparent silicone strip and a rear darkened silicone layer sandwiching therebetween a flexible printed circuit board (PCB) strip incorporating a plurality of illuminating elements;
   a clear cover secured over said front silicone strip and including an outer affixing adhesive perimeter binding for affixing to an interior surface of the windshield;
   a control box incorporated into the vehicle headliner containing motion control circuitry and which is connected via a conductor wire to a processor component;
   a power supply operating said processor component which, in response to a determined acceleration of the vehicle, being inputted a signal from the motion control circuitry which is representative of the vehicle movement; and
   said processor component providing an output signal causing said illuminating elements to generate a visual output corresponding to said input signal.

2. The visual front alert system of claim 1, said visual output further comprising a first output representative of a steady or accelerating motion of the vehicle, and a second output further representative of any of an accelerating or decelerating condition of the vehicle.

3. The visual front alert system of claim 1, said motion control circuitry further comprising an accelerometer component incorporated into said processor component.

4. The visual front alert system of claim 1, said motion control circuitry further comprising an engine control module of the vehicle communicating with said processor component.

5. The visual front alert system of claim 1, said illuminating elements further comprising light emitting diodes (LEDs).

6. The visual front alert system of claim 1, further comprising said power supply being provided to said strip shaped body and including additional connections extending between said processor component and a battery of the vehicle.

7. The visual front alert system of claim 1, further comprising a solar powered strip or sheet attached or integrated into a roof of the vehicle and connected to said strip shaped body.

8. A visual front alert system located at a vehicle windshield for instructing observers as to movement of the vehicle, said system comprising:
   a pair of strip shaped bodies located on each of driver and passenger sides of the vehicle windshield, each of said bodies including a front transparent silicone strip and a rear darkened silicone layer sandwiching therebetween a flexible printed circuit board (PCB) strip incorporating a plurality of illuminating elements communicating with a processor component incorporated into said PCB strip;
   a clear adhesive applied over said front silicone layer and including an outer affixing adhesive perimeter binding for securing said strip display bodies to an inside surface of the windshield;
   a control box incorporated into the vehicle headliner containing motion control circuitry and which is connected via a conductor wire to the processor component of each of said strip shaped bodies;
   a power supply operating said processor component which, in response to a determined acceleration of the vehicle, being inputted a signal from the motion control circuitry which is representative of the vehicle movement; and
   said processor component providing an output signal causing said illuminating elements to generate a visual output corresponding to said input signal.

9. The visual front alert system of claim 8, said visual output further comprising a first output representative of a steady or accelerating motion of the vehicle, and a second output further representative of any of an accelerating or decelerating condition of the vehicle.

10. The visual front alert system of claim 9, said visual output further comprising a further output representative of a turn signal condition which is communicated to either of said strip shaped bodies.

11. The visual front alert system of claim 8, said motion control circuitry further comprising an accelerometer component incorporated into said processor component.

12. The visual front alert system of claim 8, said motion control circuitry further comprising an engine control module of the vehicle communicating with said processor component.

13. The visual front alert system of claim 8, said illuminating elements further comprising light emitting diodes (LEDs).

* * * * *